Jan. 21, 1936.  A. J. SACKETT  2,028,413
AERATING APPARATUS FOR FERTILIZER AND THE LIKE
Filed July 6, 1934
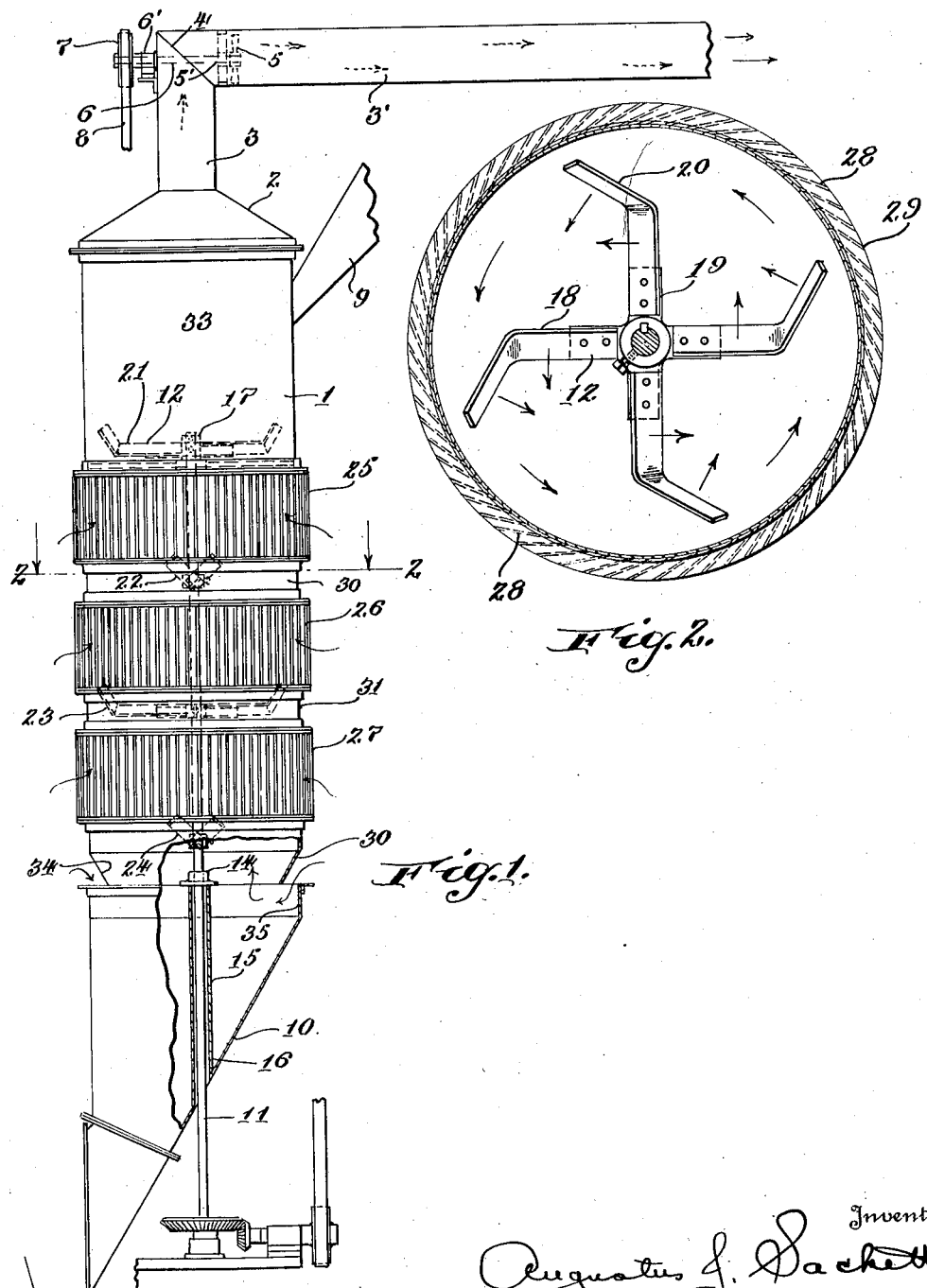
Inventor
Augustus J. Sackett
By Edwin F. Samuels
Attorney Patented Jan. 21, 1936

2,028,413

UNITED STATES PATENT OFFICE 2,028,413

AERATING APPARATUS FOR FERTILIZER AND THE LIKE

Augustus J. Sackett, Anne Arundel County, Md.

Application July 6, 1934, Serial No. 734,004

13 Claims. (Cl. 34—34)

The invention relates to the treatment of fertilizer and other comminuted materials following combination of the comminuted materials with active reagents resulting in the generation of heat. The materials in the treatment of which the apparatus has been used and in connection with which the apparatus and method of treatment have been developed are fertilizer products as ground phosphate rock and the like which have been treated with anhydrous ammonia or ammonia solutions in accordance with Patent No. 1,960,030 and in other ways whereby the comminuted phosphate rock which is first acidulated are combined with anhydrous ammonia or ammonia solutions or other reagents.

In the operation of the previous apparatus the comminuted phosphate rock thus treated is dropped on the floor in piles or stored in bins or other suitable receptacles. The heat generated keeps the material for a considerable period at relatively high temperatures which have been ascertained at from 180 to 210 degrees F., or approximately these temperatures. This necessitates the storing of the material for a considerable period in order that it may cool before it can be shipped. Also the heat of these high temperatures tends to destroy the chemical structure so that some of it reverts to its original constituents, considerable portions of the ammonia being lost, so that the material loses part of its fertilizer value. By treatment in accordance with the method and by and with the apparatus of the present invention, the temperatures are immediately reduced by about 45 to 50 degrees F. and may be so reduced as to make immediate shipment feasible. By a single treatment in the present apparatus the cooling period necessary to make shipment feasible is reduced by 50 per cent. and the temperature to be lowered to a point at which loss by reversible deterioration is prevented.

The apparatus may also be used in cooling superphosphate after it is acidulated and for creating other material.

A very important function of this apparatus is that it preserves the desirable granular structure of the ammoniated, acidulated, more generally referred to as ammoniated superphosphate.

Superphosphate when combined with anhydrous ammonia or ammonia solutions results in a product having a granular structure which makes it free flowing and a product well liked by the trade because of its good drilling qualities.

This valuable feature of the product, however, is being lost under present methods because the goods after being ammoniated are stored without any further treatment. Heat destroys this structure. By storing the ammoniated goods in piles at the high temperatures generated by the combination of superphosphate with anhydrous ammonia or ammonia solutions, this valuable physical characteristic is destroyed because the heat in the stored goods breaks down the granular structure into fines. Because this apparatus aerates the ammoniated goods before being stored thereby materially reducing its temperature and preserving the physical structure of same, it adds a fundamental step in the manufacture of a far superior product. This apparatus also exhausts the steam and moisture caused by the heat from the building and keeps moisture out of the building.

The treatment which constitutes the method of invention consists in passing the comminuted material through an area in which it is subjected to a beating action in contact with the air, the comminuted material being passed through the drum in one direction and the air draft in the opposite direction.

In accordance with the preferred form of the invention the comminuted material is passed downwardly through the apparatus by gravity, an air draft being drawn up through the apparatus in any suitable manner as by means of fans and/or convention, otherwise known as natural draft. Preferably the air is introduced into the apparatus at a series of zones spaced in the direction of the progress of the material in the process of aeration and the material is beaten in such a way as to check its downward progress and keep it in suspension, and also in such a way as to project it inwardly toward the center, whereby adhesion of the comminuted solid to the walls of the apparatus is prevented and the entrance of air is facilitated. Both the apparatus and that of my previous patent on the subject of mixing ammonia and acidulated phosphate being intended for continuous operation. The machines may be placed in series to mix the material and then aerate it, the material being passed directly as by a conveyor or elevator from one to the other.

The present apparatus in accordance with the preferred form of the invention consists of a drum or tubular casing suitably supported with its axis substantially upright. This apparatus is provided with a series of beater fans mounted on a shaft which substantially coincides with the axis of the drum, the beaters being spaced in a vertical direction and the drum being provided with perforated portions between the beaters, the perforated portions being preferably provided with vanes inclined outwardly and backwardly as to the direction of rotation so that the cooling air is drawn in by the beaters and passed upwardly in opposition to the progress of the comminuted material and the escape of the comminuted material is prevented. The progress of the comminuted material is checked by the operation of the beater fans which are preferably inclined backwardly and upwardly, i. e., oppositely to the direction of rotation. In this way the dwell of the material in the apparatus is prolonged to a predetermined degree sufficient to provide for the desired period of aeration.

In the drawing:

Figure 1 is a side elevation of the apparatus in the preferred form assembled for operation, a portion of the bottom being broken away and illustrated in section.

Figure 2 is a horizontal section on the line 2, 2 in Figure 1 looking downwardly as indicated by the arrows.

Referring to the drawing by numerals, each of which is used to indicate the same or similar parts in the different figures, the apparatus as shown comprises an upright tubular casing 1, which as shown terminates at the top in a frustro conical cover or roof 2 from which an air discharge pipe 3 leads to the outside air or any suitable separator not shown. As illustrated, the discharge pipe 3 as it leaves the casing or drum 1, extends upward in a vertical direction for a few feet, at which point there is an elbow 4 and the remainder of the discharge pipe at 3' is disposed in a horizontal direction. This arrangement provides for the convenient installation of a fan 5 which as shown is mounted on a horizontal shaft 6, having bearings 5' and 6'. The fan is located in the horizontal portion 3' of the discharge pipe and arranged to accelerate the outgoing draft. The fan as illustrated is driven by a pulley 7 on the shaft 6 which projects outwardly through the elbow as shown. The pulley is operated by a belt 8, it being understood that any suitable drive may be used. The casing 1 as shown, is also provided with a chute 9 near the top by which the comminuted material already referred to is fed to the apparatus.

At the bottom the casing 1 is provided with a discharge chute 10 which is inclined to the side and the casing is provided with a central upright shaft 11 on which the beater or fan blades 12 are mounted and by which they are driven. This shaft 11 is provided with a suitable bearing 14 supported in the casing near the bottom and it is further enclosed within a tube 15 which extends downwardly through the chute beneath the bearing protecting the lower portion of the shaft from the accumulation of material. This tube 15 is supported on the bottom of the chute 10 which is apertured in alignment therewith, the tube being secured to the bottom of the chute by welding or brazing in any suitable manner as illustrated at 16. The beaters or sets of fan blades 12 as shown are four in number, each set being provided with a hub 17 secured to the shaft. Each set as shown consisting of four or any suitable number of rotating blades 18 inclined downwardly and forwardly in the direction of rotation as to the main portion of said blades at 19 which extends outward radially, and the outer ends of the blades are turned forwardly at 20 at a sharp angle to the radial portion 19. The deflected ends 20 serve to draw the air supply into the drums and to gather the material inwardly toward the center and prevent projection of the material outwardly by centrifugal force, the main inclined portions 19 of the blades already described have the effect of raising the material so that it is suspended within the drum for a predetermined period dependent on the angle of the blades, the number of the blades and the speed of rotation, the period of suspension, i. e., the period of the passage of the material downwardly through the apparatus being thus proportioned to give the desired period of treatment. The blades 12, as already pointed out, are in four or any suitable number of sets 21, 22, 23, 24, suitably spaced apart and the drum or tubular casing 1 includes a corresponding number of perforated zones 25, 26 and 27, one between each two adjacent sets of blades. In the form of the invention shown these perforated zones 25, 26 and 27 are composed of vanes 28 which form the walls of the tubular casing or drum as to these respective zones. These blades are preferably upright or otherwise parallel to the axis and are spaced apart to provide air admission or inlet openings 29 through which air is drawn inwardly not only by the natural draft due to the heat of the material but by the draft fan 5 and the beater fans 12, the forwardly turned ends 20 of which have a strong tendency to accelerate the inward draft which is also accelerated by the upwardly projecting action of the forwardly and downwardly inclined portions of the blades at 19. The vanes 29 are preferably inclined backwardly and outwardly which is also forwardly and inwardly, the terms forward and backward having reference to the direction of rotation of the blades 12 which in the form of the invention shown is contra clockwise as seen from above.

This arrangement facilitates the entrance of the air and prevents the discharge through the air inlet openings 29 of the comminuted material being treated.

Between the air inlet zones 25, 26, 27, the casing is shown as provided with imperforate zones or rings 30 and 31. The upper portion of the casing at 33 is also shown as imperforate and at the bottom beneath the lower perforated zone 27 there is an inverted frusto conical portion or zone 34 whereby the material is discharged into the chute 10. This frusto conical portion or discharge 34 overlies or otherwise cooperates with the upwardly disposed open end 35 of the chute 10 which open end 35 is shown as of considerably greater diameter than the lower end of the inverted frusto conical discharge 34 providing an annular opening 36 to admit air which is drawn downwardly and inwardly both by the suction of the beater fans 12, and by fan 5, and by the natural draft through the apparatus due to the heat of the material.

In the operation of the apparatus the comminuted material to be aerated is fed by gravity or in any suitable manner through the chute 9 to the casing 1. As already pointed out, the apparatus is particularly adapted to the aeration and cooling of comminuted phosphate rock which has been acidulated and combined with anhydrous ammonia or ammonia solutions in accordance with my Patent No. 1,960,030. This material is discharged from the mixing apparatus at temperatures of approximately 180 to 210 degrees F. which tends to destroy the chemical structure and cause the reversion to a considerable extent with the corresponding loss of fertilizer value. This material must be cooled immediately after mixing to maintain the structure and prevent the loss of part of its active elements. Also, it is not available for shipment until cooled to normal or nearly normal temperatures which requires two or three weeks with a corresponding loss of time. This or other comminuted material requiring cooling or aeration is fed continuously to the apparatus as aforesaid and the shaft 11 with the beater fans 12 being rotated and the fan 5 being operated, air is drawn in through the air admission openings 29 composing the zones 25, 26, 27, also through the air admission opening 36 at the bottom, the air thus introduced being passed upwardly through the apparatus in opposition to the passage of the comminuted material and released through the discharge pipe 3, 3'.

In the downward progress of the comminuted material to be aerated, it is distributed over the entire cross sectional area of the apparatus by the beater fans 12 and kept out of contact with the walls of the apparatus by the forwardly deflected beater ends 20. These beaters inclined downwardly and forwardly as aforesaid at 19 also have the effect of throwing the material upwardly as it encounters them whereby the downward passage of the comminuted material through the apparatus in opposition to the air draft is retarded, the material being suspended in the air so that it is completely aerated and retained in the apparatus for a period sufficient for the desired treatment, which period is determined by the number of beaters, the speed of rotation, the incline of the beaters, the area of the air openings and the amount of material fed. The desired period of treatment is ascertained by experiment so that it is adapted to the conditions to be met as the temperature of the material, its chemical constituents and the resulting temperature desired. It is found that by a single treatment in the apparatus the time required for cooling from the temperatures given to a normal temperature of 80 to 100 degrees F. or thereabouts can be cut in halves, i. e., reduced fifty per cent, and by further treatment or adjustment of the apparatus as aforesaid, any desired degree of cooling can be obtained. In the practice of the invention up to the present time a single treatment has been employed by which the temperature of the product is reduced by 45 or 50 degrees from a temperature of 180 to 210 degrees F. This reduces the period during which the material must be stored or shipped from two or three weeks to one week to ten days, and completely prevents deterioration of the material and loss of its active fertilizer elements.

I have thus described specifically and in detail a single embodiment of the apparatus of the invention, and also the method of treating the fertilizer which is practiced in connection with this apparatus, the description being specific and in detail in order that the manner of constructing, operating, applying and using the invention may be fully understood, however, the specific terms herein are used descriptively rather than in a limiting sense, the scope of the invention being defined in the claims.

What I claim as new and desire to secure by Letters Patent is:

1. The method of cooling and aerating comminuted fertilizer materials and the like after chemical combination thereof which consists in passing the comminuted solid materials in a continuous stream downwardly, successively retarding the downward passage of the comminuted solid by rotating and beating and tossing portions of the material upwardly and gathering the same into cyclonic form, introducing air in the direction of rotation and into the path of the comminuted solids and passing the air upwardly in the opposite direction to the passage of the comminuted solids, the time of passage of the solids and the amount and speed of the air draft being determined to give the desired degree of cooling and aeration.

2. The method of cooling and aerating comminuted fertilizer materials and the like after chemical combination thereof which consists in passing the comminuted solid materials in a continuous stream downwardly, successively retarding the downward passage of the comminuted solid by rotating and beating and tossing portions of the material upwardly at intervals, and gathering the same into cyclonic form introducing air into the path of the comminuted solids substantially around the periphery of the same at successive points spaced along its path and passing the air upwardly in the opposite direction to the passage of the comminuted solids, the time of passage of the solids and the amount and speed of the air draft being determined to give the desired degree of cooling and aeration.

3. In an apparatus for aerating and cooling comminuted solids, an upright casing having air inlet openings spaced downwardly from the top of the casing, means for feeding the material to the top and discharging it at the bottom, rotary beaters in said casing, spaced in the direction of its length and having blades transversely inclined forwardly and downwardly in the direction of rotation so that they tend to retard the passage of the material through the casing, the respective air inlet openings being located adjacent some of the respective beaters so that the beaters serve to draw the air inwardly and force it upwardly through the comminuted material in opposition to the general direction of motion of the same.

4. In an apparatus for aerating and cooling comminuted solids, an upright casing having air inlet openings, rotary beaters in said casing, spaced in a vertical direction and inclined forwardly and downwardly in the direction of rotation so that they tend to retard the passage of the material through the casing, the respective air inlet openings being located immediately below the corresponding beaters so that the beaters serve to draw air inwardly and force it upwardly through the comminuted material in opposition to the direction of motion of the same, the beaters being forwardly disposed at their ends whereby the inward air draft is assisted and the bulk material is kept off of the walls of the casing, means for feeding the material to the casing at the top of the casing and discharging it at the bottom.

5. In an apparatus for aerating and cooling comminuted solids, an upright casing having air inlet openings at the sides, means for feeding the comminuted material at the top of the casing and discharging it at the bottom, rotary beaters in said casing, spaced in a vertical direction and having blades which are transversely inclined forwardly and downwardly in the direction of rotation so that they tend to retard the progress of the material through the casing, the respective air inlet openings being located below the respective beaters so that the beaters serve to draw air inwardly and force it upwardly through the comminuted material in opposition to the general direction of the motion of the same, the casing having wall portions composed of spaced vanes which are inclined outwardly and backwardly as to the direction of rotation of the beater fans, part of said air inlet openings being the spaces between the vanes.

6. In an apparatus for aerating and cooling the comminuted solids, an upright tubular casing having air inlet openings at the sides, rotary beaters in said casing, spaced in a vertical direction and having blades which are inclined forwardly and downwardly in the direction of rotation so that they tend to retard the progress of the material through the casing, certain of the air inlet openings being located immediately adjacent the beaters so that the beaters serve to draw air inwardly and force it upwardly through the comminuted material in opposition to the general direction of the motion of the same, the beater blades being forwardly disposed at their ends whereby the inward air draft is assisted and the bulk material is kept off of the walls of the casing, the casing having wall portions composed of vanes which are inclined outwardly and backwardly as to the direction of rotation of the beater fans.

7. In an apparatus for aerating and cooling comminuted solids, an upright tubular casing having air inlet openings at the sides, means for feeding the comminuted material at the top of the casing and discharging it at the bottom, and rotary beaters in said casing, spaced in a vertical direction and having blades inclined forwardly and downwardly in the direction of rotation so that they tend to retard the progress of the material through the casing, air inlet openings being located below the beaters so that the beaters serve to draw air inwardly and force it upwardly through the comminuted material in opposition to the direction of motion of the same, the casing having an inwardly inclined portion near the bottom with a downwardly disposed air inlet opening at the bottom of said inclined portion.

8. In an apparatus for aerating and cooling comminuted solid materials, an upright tubular casing having an air discharge passage at the top, a fan in said passage with means for operating the same to accelerate the discharge of air, means for introducing comminuted material to the casing near the top of the casing and discharging it at the bottom, beater fans in the casing spaced apart in the direction of the axis and having substantially horizontal rotating blades with means for rotating the blades about an upright axis, the casing having passages for admission of air below the respective blades.

9. In an apparatus for aerating and cooling comminuted solid materials, an upright tubular casing having an air discharge passage at the top, a fan in said passage with means for operating the same to accelerate the discharge, means for introducing comminuted material continuously near the top of the casing, and means for discharging it continuously at the bottom, beater fans in the casing spaced apart in a vertical direction and having substantially horizontal rotating blades with means for rotating the blades about an upright axis, the casing having perforations for admission of air immediately below part of the blades, the beater fan blades being downwardly and forwardly inclined to project the material upwardly and retard its downward passage.

10. In an apparatus for aerating and cooling comminuted solid materials an upright tubular casing having an air discharge passage at the top, a fan in said passage with means for operating the same to accelerate the discharge, means for continuously introducing comminuted material near the top of the casing and for discharging it at the bottom, beater fans in the casing spaced apart in a vertical direction and having substantially horizontal radiating blades with means for rotating the blades about an upright axis, the casing having perforations for admission of air adjacent part of the respective blades, the beater fan blades being downwardly and forwardly inclined to project the material upwardly and retard its downward passage, the walls of the casing comprising outwardly and rearwardly inclined vanes between which vanes the air openings are formed.

11. In an apparatus for aerating and cooling comminuted solid materials an upright tubular casing having an air discharge passage at the top, a fan in said passage with means for operating the same to accelerate the discharge, means for introducing comminuted material near the top of the casing and passing it downwardly through the casing, beater fans in the casing spaced apart in an upright direction and having substantially horizontal radiating blades with means for rotating the blades about an upright axis, the casing having perforations for admission of air below one set of blades, the beater fan blades being outwardly and forwardly inclined to project the material upwardly and retard its downward passage, the walls of the casing comprising outwardly and rearwardly inclined vanes between which vanes the air openings are formed, the beater blades being downwardly and forwardly inclined.

12. In an apparatus for aerating and cooling comminuted solid materials an upright tubular casing having an air discharge passage at the top, a fan in said passage with means for operating the same to accelerate the discharge, means for introducing comminuted material near the top of the casing and passing it through the casing, beater fans in the casing spaced apart in the general direction of motion of the material in the casing and having sets of substantially horizontal radiating blades with means for rotating the blades about an upright axis, the casing having perforations for admission of air immediately below each of a plurality of sets of blades, the beater fan blades being downwardly and forwardly inclined to project the material upwardly and retard its downward passage, the walls of the casing comprising outwardly and rearwardly inclined vanes between which vanes part of the air openings are formed, the beater blades having their ends inclined forwardly in the direction of rotation.

13. In an apparatus for aerating and cooling comminuted solid materials an upright tubular casing having an air discharge passage at the top, a vent in said passage with means for operating the same to accelerate the discharge, means for introducing comminuted material near the top of the casing and passing it downwardly through the casing, sets of beater fans in the casing spaced apart in the direction of passage of the material and having substantially horizontal radiating blades with means for rotating the blades, the casing having perforations for admission of air adjacent some of the respective sets of blades, the beater fan blades being downwardly and forwardly inclined to project the material upwardly and retard its downward passage, the walls of the casing comprising outwardly and rearwardly inclined vanes between which vanes some of the air openings are formed, the beater blades having their ends inclined forwardly in the direction of rotation.

AUGUSTUS J. SACKETT.